Patented July 17, 1928.

1,677,615

UNITED STATES PATENT OFFICE.

AUGUSTE BOIDIN, OF SECLIN, FRANCE, AND JEAN EFFRONT, OF BRUSSELS, BELGIUM.

PREPARED STARCH MATERIAL AND PROCESS OF MAKING IT.

No Drawing.   Application filed February 24, 1925. Serial No. 11,330.

This invention relates to a prepared starch suitable for sizings, such as those employed for sizing textile materials of all kinds, and to a process of making it.

It is the object of the present invention to supply what may be termed a dry or solid starch material which can be readily converted into a starch sizing in a simple manner, merely by adding some water and allowing the mixture to stand for a sufficient time at the proper temperature. In stating that the prepared starch, which forms the subject of this invention, is dried, it is to be understood that it may contain a small amount of moisture such as is usually found in air-dried material and generally not amounting to more than 15%. In the best form of the invention the prepared starch is a powder which may be readily stirred into water in order to produce the desired sizing.

In carrying out the invention a starch extracted from grain, or tubers and most advantageously in a powdered condition, is provided with a charge of diastatic enzymes produced by starch-liquifying micro-organisms, such as bacteria, in such a way that the resulting mixture is still a solid. The bacterial enzymes may be prepared by methods such as outlined in United States Patent 1,227,525. The amount of enzyme liquor to be added to the starch depends, of course, upon its activity. In usual practice employing bacterial enzyme liquor, such as would be produced by the process of United States Patent 1,227,525, it will be sufficient to use from about 1% to 10% by weight of such liquor. It is also important to avoid acidity in the starch preparation. If the starch is neutral or slightly alkaline it is only necessary to combine it directly with the liquor containing the bacterial enzymes. If, however, the starch is acid it may be necessary to neutralize this as, for example, with ammonium hydroxide or sodium carbonate. If this new product is being prepared in a starch factory, the wet starch, brought to a neutral or slightly alkaline condition, may be mixed with the desired percentage of liquor containing the bacterial enzymes and the mixture may then be dried in any suitable way to produce the final solid prepared starch. In drying the mixture it is advisable to work at low temperatures as, for example, by the aid of a vacuum pan. Or the starch, after being brought to a neutral or slightly alkaline condition, may be dried very thoroughly so as to remove a large part of its water contents, whereby the addition of the enzyme liquor will leave the product with a percentage of moisture about equivalent to air-dried starch so that the product is still a solid product, as distinguished from a damp or pasty mass. The prepared starch, containing the charge of suitable bacterial enzymes, may be packed in ordinary pasteboard containers or ordinary barrels in the same manner as ordinary starch is packed and transported at the present time. By maintaining the product in an air-dried condition it may be kept for a considerable time without injury to the enzymes and without injury to the product.

When sizing is to be made from the product prepared as above described, water at a temperature of about 60° may be added to the prepared starch in the proportion of about 1 gallon of water for each pound of the prepared starch, the whole being well stirred in order to bring about a thorough mixture. The mixture is then allowed to stand or the temperature may be gradually or qiuckly raised to any point between 60° and 98° C. When the mixture has reached a temperature somewhat below 75° C. the enzymes begin to modify and liquefy the starch. The liquefying action continues and, in fact, usually increases somewhat as the temperature is raised to 80 or 85° C. As soon as the liquefaction has proceeded sufficiently for the purpose desired, the enzyme action is stopped either by the addition of an acid to the mixture or by quickly raising the temperature of the mixture to the boiling point or both. Any suitable acid may be used to stop the action of the enzymes, such as, for example, acetic acid, formic acid, or the like. In ordinary practice acetic acid is considered the most satisfactory. The resulting liquid mixture is highly satisfactory as a sizing or dressing because, although it may contain as much as 35% of starch, it will be quite limpid and well adapted to impregnate properly the textile fibres.

A great advantage of the dry, solid prepared starch is that the user may prepare from it sizings of various grades according to the particular textile material which is to be sized. This is possible because the enzyme will liquefy the starch to various extents depending upon the length of time the material is allowed to stand before the enzyme action is stopped by the addition of acid or boiling.

Where the process is to be carried out at a starch factory, the following procedure will give highly satisfactory results:

The milk of starch which is produced in carrying out the usual starch refining process, is neutralized to the point where the well known bromo-thymol test of a sample will show a green coloration, or the litmus test will show a perceptible pale blue. The milk of starch neutralized as stated is then treated with a neutral antiseptic, for example, one per thousand by weight of phenol, in order to prevent subsequent acidification by fermentation. Then the starch is recovered from the milk of starch in any of the usual ways, as for example, allowing the liquid to stand and precipitate the starch, or by centrifuging the liquid and thereby throwing out the solids. The solids obtained from the milk of starch are then dried rapidly at about 50° to 60° C. most advantageously in a strong current of air, without attempting in any way to obtain crystals of starch. An important feature of the invention consists in pushing the drying operation beyond the point usually considered sufficient for usual starch. That is to say, in the ordinary process, the product is considered entirely satisfactory when it still contains 13 to 14% of water of combination. According to the present invention, however, the best results are obtained by reducing such moisture to about 5 to 10%, for the reason hereinafter explained.

The dry product is finely pulverized and cooled to a low temperature and then provided with a charge of suitable enzymes. In the best embodiment of the invention about 1 to 5 liters of bacterial enzyme solution are added to 100 kilos of the dry pulverized starch, and the whole beaten or kneaded thoroughly to obtain as complete a mixture as is possible. Because of the relatively low percentage of moisture in the dry starch, the moisture carried by the enzyme solution is quickly absorbed and finally is disseminated through the mass of starch, so that the final product contains no more than the usual 13 to 14% of the ordinary starch product. Hence the enzymes pass quickly to a dry state and show great stability if the neutrality of the starting material has been insured by the tests hereinbefore explained.

It has been found that the most favorable hydrogen ion concentration is between the limits of p. H. 6.8 and 8 when employing enzymes such as furnished by bacteria of the species *mesentericus* or *subtilis*. With enzymes of the other origin the optimum p. H. should be determined by a few tests, but will not be far from the limits stated above.

The dry product charged with enzymes obtained as above described will show excellent keeping quality, being as good in this respect as ordinary starch.

When size or dressing is to be made from the said product it is first well mixed with a small quantity of cold water. Then the requisite amount of boiling water is added to the cold water mixture, with suitable stirring, the amount of water added depending upon the desired viscosity of the size. After sufficient action, the enzymes are destroyed by adding a slight amount of a suitable organic acid, for example acetic acid, it being necessary to use just sufficient to make the size very slightly acid.

Finally there may be added, as usual, an antiseptic to insure the keeping qualities of the size, for instance, salicylic or benzoic acid.

What is claimed is:

1. The process of making a dry starch product suitable for the preparation of sizings, which consists in combining a preparation of enzymes, made by micro-organisms capable of liquefying starch, with a neutral starch, and controlling the relative moisture content of the enzyme preparation and the starch so that the resultant product will not contain more moisture than an air-dried product.

2. The process of making a dry starch product suitable for the preparation of sizings, which consists in drying a neutral starch to a point where its moisture content is not greater than about 10% and then adding a solution of enzymes produced by micro-organisms capable of liquefying the starch, the proportion of solution added relative to the starch being such that the resultant product will not contain more than about 14% moisture.

3. The process of making a dry starch product suitable for the preparation of sizings, which consists in drying a neutral extracted starch to a point where its moisture content is not greater than about 10% and then adding a solution of bacterial enzymes capable of liquefying the starch, the proportion of solution added relative to the starch being such that the resultant product will not contain more than about 14% moisture.

4. The process of making a dry starch product suitable for the preparation of sizings, which consists in treating a milk of starch to bring it to a hydrogen-ion concentration between $P_H$ 6.8 and 8, then recovering the solids from said milk of starch, then drying the solids until the moisture content is not greater than 10%, then adding a solution of bacterial enzymes capable of liquefying starch, the amount of such solution being between 1 and 5% by weight of the dry starch, and then mixing the solution and starch.

5. As a new composition of matter, a solid starch material carrying a charge of starch-liquefying bacterial enzymes sufficient to cause a liquefaction of the starch when the material is subjected to suitable conditions, substantially as described.

6. As a new composition of matter, a mixture of starch material and starch-liquefying bacterial enzymes, the mixture being in solid form and containing not more than about 15% moisture.

7. As a new composition of matter, a mixture of starch and starch-liquefying bacterial enzymes, the mixture being in the form of a powder and containing moisture in an amount not greater than ordinary air-dried starch.

8. As a new composition of matter, a solid starch material carrying a charge of starch liquefying enzyme sufficient to cause a liquefaction of the starch when the material is subjected to suitable conditions, substantially as described.

In testimony whereof, we have hereunto set our hands.

AUGUSTE BOIDIN.
JEAN EFFRONT.